Patented Oct. 24, 1944

2,361,018

UNITED STATES PATENT OFFICE 2,361,018

ARTIFICIAL DRYING OIL

Howard L. Gerhart, Milwaukee, Wis., assignor to Pittsburgh Plate Glass Company, Allegheny County, Pa., a corporation of Pennsylvania No Drawing. Application July 6, 1940, Serial No. 344,248

4 Claims. (Cl. 260—23)

The present invention relates to resin-like products which may be prepared artificially and it has particular relation to a liquid product that can be formed by interaction of glyceride oils and diene hydrocarbons, e. g., cyclic dienes, such as cyclopentadiene or cyclohexadiene.

One object of the invention is to provide a resinous product which is a fluid medium susceptible of application as a coating film to surfaces, and which when so applied sets up or hardens by oxidation and polymerization in the same manner as a natural drying oil.

A second object of the invention is to provide a composition of the foregoing type which can be prepared readily and economically and which when prepared possesses a rate of drying superior to the oil from which it is prepared.

These and other objects will be apparent from consideration of the following specification and the appended claims.

In the formulation of paints and varnishes it is customary to employ a so-called drying oil, such as linseed oil, tung oil or the like, appropriately combined with pigments, dyes, driers, diluents and other compounding ingredients to provide liquid compositions that can be spread by spraying, brushing, or other methods to provide films which, upon exposure to air, harden to firm, adherent state.

It is desirable that the films dry or harden within a short period of time, otherwise dust and other particles from the atmosphere are likely to collect upon and adhere to them and they are unduly subject to marring by the action of the weather or by contact with foreign moving objects. Also, the time during which the coated articles are withheld from service while the coatings are drying is unduly extended. Unfortunately natural oils even when compounded with driers do not perfectly meet requirements imposed upon them.

The present invention involves the discovery that drying, semi-drying and non-drying glycerides can be reacted with cyclopentadiene under appropriate conditions to provide an oily liquid resin much resembling natural oil and which alone or when compounded with dyes, pigments, driers, thinners, etc. can be spread as films that dry substantially faster than the glyceride from which they are derived. These "long oil cyclopentadiene resins" are characterized by their rapid loss of tack and by a final film which exhibits the characteristic, for example, of the linseed oil or soya bean oil film. One practical advantage lies in the fact that the drying time of the original oil is always shortened and especially significant is the fact that the time to dry tack-free is noticeably shortened.

Many different glycerides and ratios of glycerides may be employed within the purview of the inventions. The following among others have been treated successfully:

Corn oil
Soya oil
Cottonseed oil
Fish oil
Perilla oil
Tung oil
Castor oil
Dehydrated castor oil
Linseed oil
Peanut oil
Palm oil In the preparation of the reaction product of the glycerides and the cyclopentadiene the oil may be employed in a ratio of 60 to 95 per cent while the cyclopentadiene may comprise 5 to 40 per cent of the mixture. In general, the reaction will be conducted at a temperature of about 30 to 70° C. and usually will be sufficient and complete within a period of 30 to 150 minutes.

Suitable catalysts for the reaction are boron fluoride, the complex of boron fluoride and ether, dihydroxyfluoboric acid, stannic chloride and in general in halides of all the amphoteric metals. These will be employed in relatively small amounts, for example, ½ to 10 per cent of the reaction mixture.

During the polymerization treatment, the oil increases in viscosity and by the proper adjustment of oil to cylopentadiene, catalyst concentration, time and temperature, any degree of viscosity intermediate between that of the oil and the gel stage can be obtained. The viscosity can, of course, be reduced by adding thinners.

The following example illustrates the application of this process to one oil:

Into 70 parts of a bodied soya oil (200 seconds viscosity) and 30 parts of monomeric cyclopentadiene, there is passed slowly with stirring and cooling, 1 to 2 parts of boron fluoride gas as a reaction catalyst so that the temperature of the mixture rises from 30 to 70° C. in an hour. Depending on the viscosity desired, the resin is stirred from 30 to 150 minutes at 60° C. At the end of 30 minutes, a body of 500 seconds viscosity may be obtained by passing ammonia gas through the mixture until the dark color has turned to light amber or yellow. The action of the catalyst is always arrested by adding a base such as ammonia, alkyl amines, soda lime, etc. This synthetic oil will dry tack free in three hours, whereas the original oil requires about a day. The oil will dry faster than linseed oil and faster than linseed—wood oil combinations.

These oily resins are compatible with other oils, such as linseed oil, soya bean oil, China-wood oil, and may be used in amounts for example of 5 to 95 per cent, based upon the total mixture, in order to obtain rapid drying of the oils. The resin oils may be employed in clear state or with dyes of various types and with coloring and obscuring pigments, such as basic lead carbonate, titanium dioxide, lithopone, red lead and the like. In general the ratio of pigment will be within a range of about 5 to 60 per cent, based upon the total content of the composition. Driers, such as naphthanates or oleates of manganese, lead and the like may be added in the usual amounts employed for paints and varnishes. These are usually added in such ratio that the metal in the drier will be equal in weight of about 0.02 to 0.5 per cent of the oil. Diluents and thinners such as turpentine may be added in amounts up to 60 per cent.

The compositions may be employed as coating media for wood, iron, aluminum and any of the other materials on which paints and varnishes are commonly applied. The quick drying oily resins may also be combined with pigmentary bodies, such as lamp black, powdered bronze, powdered aluminum and the like to provide printing inks which, when spread upon types or plates employed in a conventional printing process, dry upon the paper with great rapidity. Drying of the ink after printing may be expedited by exposure to heat. Paper fabrics and the like may be provided with continuous films by roll coating or other operations.

In the preparation of a varnish composition the oil-like resins are well adapted for cooking with resins and gums in accordance with common varnish procedure employed in connection with conventional oils. In the preparation of a cooked varnish, oily resins of the following composition have been employed:

80% soya_____ 20 cyclopentadiene
70% soya_____ 30 cyclopentadiene
80% linseed_____ 20 cyclopentadiene
60% linseed; 20% soya___ 20 cyclopentadiene These oils are easily cooked in varnishes by heating with drying oil soluble resins such as the following: rosin, estergum, Amberol, polyindene, cumarone, phenolic (Bakelites).

*Example I*

Synthetic oil made from 300 parts bodied linseed oil (600 seconds viscosity) and 100 parts cyclopentadiene or cyclohexadiene were heated with 120 parts of ester gum, having an acid number of 5. The temperature was maintained at 300° F. until the gum was dissolved then raised to 470° F. during 45 minutes. Subsequently the composition was cooled. The phthalic acid-glycerol resins when suitably modified with drying oils or free fatty acids of drying oils can also be employed in place of ester gum.

*Example II*

Synthetic oil made from approximately 357 parts bodied soya bean oil (200 seconds viscosity) and 143 parts monomeric cyclopentadiene, was heated with 70 parts ester gum, of an acid number of 50, until the gum was completely dissolved. At 400° F. 30 grams of a heat reactive phenol-formaldehyde resin was added and the heating was resumed after the foaming had subsided. In 40 minutes the temperature was raised from 400 to 500° F. The product was then cooled and thinned with petroleum thinners. The cooked varnishes can be combined with pigments and spread by usual methods.

Varnishes made from linseed and soya-cyclopentadiene synthetic oils dry more rapidly than the usual linseed—tung oil varnishes. The usual set-up time is 2 hours and the varnishes are dry to the touch in less than 5 hours. After overnight drying they compare favorably in hardness with wood oil varnishes. These varnishes are characterized by good water resistance and high gloss.

The forms of the invention herein disclosed are to be considered as being merely exemplary. It will be apparent that numerous modifications may be made therein without departure from the spirit of the invention or the scope of the appended claims.

What I claim is:

1. A liquid coating composition having the air drying characteristics of a drying oil, said composition consisting essentially of the product obtained by cooking a drying oil soluble resin, and a liquid conjoint polymerization product of a heated mixture consisting essentially of cyclopentadiene and an unsaturated glyceride oil.

2. A liquid coating composition having the air drying characteristics of a drying oil, said composition consisting essentially of the product obtained by cooking, a drying oil soluble resin and a liquid conjoint polymerization product of a heated mixture consisting essentially of 5 to 40 parts of cyclopentadiene and 60 to 95 parts of an unsaturated glyceride oil.

3. A quick air drying liquid coating composition comprising a cooked mixture of an oil soluble resin and a liquid polymerization product of cyclopentadiene and an unsaturated glyceride oil obtained by admixing cyclopentadiene, unsaturated glyceride oil and a halogen compound of an element whose oxide is amphoteric, as a catalyst and subjecting the mixture to a temperature of about 30–70° C. until a desired degree of polymerization has been obtained.

4. A quick air drying liquid coating composition comprising a cooked mixture of (A) an oil soluble resin and (B) a liquid conjoint polymerization product of 5 to 40 parts of cyclopentadiene and 60 to 95 parts of a drying glyceride oil, said product being obtained by admixing cyclopentadiene, drying glyceride oil and a halogen compound of an element whose oxide is amphoteric, as a catalyst and maintaining the mixture at a temperature of about 30 to 70° C. until a desired degree of polymerization has been obtained.

HOWARD L. GERHART.